US 7,686,221 B2

(12) United States Patent
Chiba et al.

(10) Patent No.: US 7,686,221 B2
(45) Date of Patent: *Mar. 30, 2010

(54) IMAGE READING APPARATUS

(75) Inventors: Hirotaka Chiba, Kawasaki (JP);
Nobuyasu Yamaguchi, Kawasaki (JP);
Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1112 days.

This patent is subject to a terminal disclaimer.

(21) Appl. No.: 11/059,599

(22) Filed: Feb. 17, 2005

(65) Prior Publication Data

US 2005/0156047 A1     Jul. 21, 2005

Related U.S. Application Data

(63) Continuation of application No. 10/419,183, filed on Apr. 21, 2003, now Pat. No. 6,886,749.

(30) Foreign Application Priority Data

May 31, 2002  (JP)  ............................. 2002-160213

(51) Int. Cl.
*G06K 7/10* (2006.01)
(52) U.S. Cl. .................................. 235/454; 235/472.01
(58) Field of Classification Search ................ 235/454, 235/472.01–472.03
See application file for complete search history.

(56) References Cited

U.S. PATENT DOCUMENTS

| 4,751,583 | A | * | 6/1988 | Levine .................. 358/403 |
| 5,159,546 | A | | 10/1992 | Inoue et al. |
| 5,227,614 | A | | 7/1993 | Danielson et al. |
| 5,604,640 | A | | 2/1997 | Zipf et al. |
| 5,867,795 | A | | 2/1999 | Novis et al. |
| 5,995,077 | A | | 11/1999 | Wilcox et al. |

(Continued)

FOREIGN PATENT DOCUMENTS

JP     8-234693     9/1996

(Continued)

OTHER PUBLICATIONS

Japanese Patent Office Decision of Rejection, mailed Dec. 19, 2006, and issued in corresponding Japanese Patent Application No. 2002-160213.

(Continued)

*Primary Examiner*—Seung H Lee
(74) *Attorney, Agent, or Firm*—Staas & Halsey LLP

(57) ABSTRACT

An image reading apparatus is attached to the top of a PDA. During the image reading operation, an operation state control signal is output from the image reading apparatus to the PDA. According to the signal, the intensity of an input display unit not required during the operation can be reduced. Additionally, the power supply or the supply of a signal not required during the operation is stopped. Furthermore, an LED of the PDA issues a notification of an operation state by lighting, blinking, or turning-off. When the input display unit displays an image, an erect image and an inverted image are appropriately switched depending on the operation state. During an image reading operation, input by input buttons and a touch panel of the input display unit are nullified to avoid the occurrence of a malfunction.

1 Claim, 16 Drawing Sheets

U.S. PATENT DOCUMENTS

| | | |
|---|---|---|
| 6,016,135 A | 1/2000 | Biss et al. |
| 6,024,288 A | 2/2000 | Gottlich et al. |
| 6,065,679 A | 5/2000 | Levie et al. |
| 6,624,828 B1 | 9/2003 | Dresevic et al. |
| 6,693,619 B1 * | 2/2004 | Miura et al. ............... 345/102 |
| 6,886,749 B2 * | 5/2005 | Chiba et al. ............... 235/454 |
| 2002/0005434 A1 | 1/2002 | Murakami et al. |

FOREIGN PATENT DOCUMENTS

| | | |
|---|---|---|
| JP | 8-313905 | 11/1996 |
| JP | 8-335991 | 12/1996 |
| JP | 08320954 | 12/1996 |
| JP | 11-220587 | 8/1999 |
| JP | 2001-201986 | 7/2001 |
| JP | 2001-298564 | 10/2001 |
| JP | 2002-002063 | 1/2002 |
| JP | 2002-032392 | 1/2002 |
| WO | WO 9810368 | 3/1998 |

OTHER PUBLICATIONS

Notice of Rejection Grounds for corresponding Japanese Application No. 2002-160213 mailed Aug. 22, 2006.

U.S. Office Action mailed Mar. 1, 2004 in corresponding U.S. Patent 6,886,749.

U.S. Office Action mailed Sep. 8, 2004 in corresponding U.S. Patent 6,886,749.

U.S. Notice of Allowance mailed Jan. 4, 2005 in corresponding U.S. Patent 6,886,749.

* cited by examiner

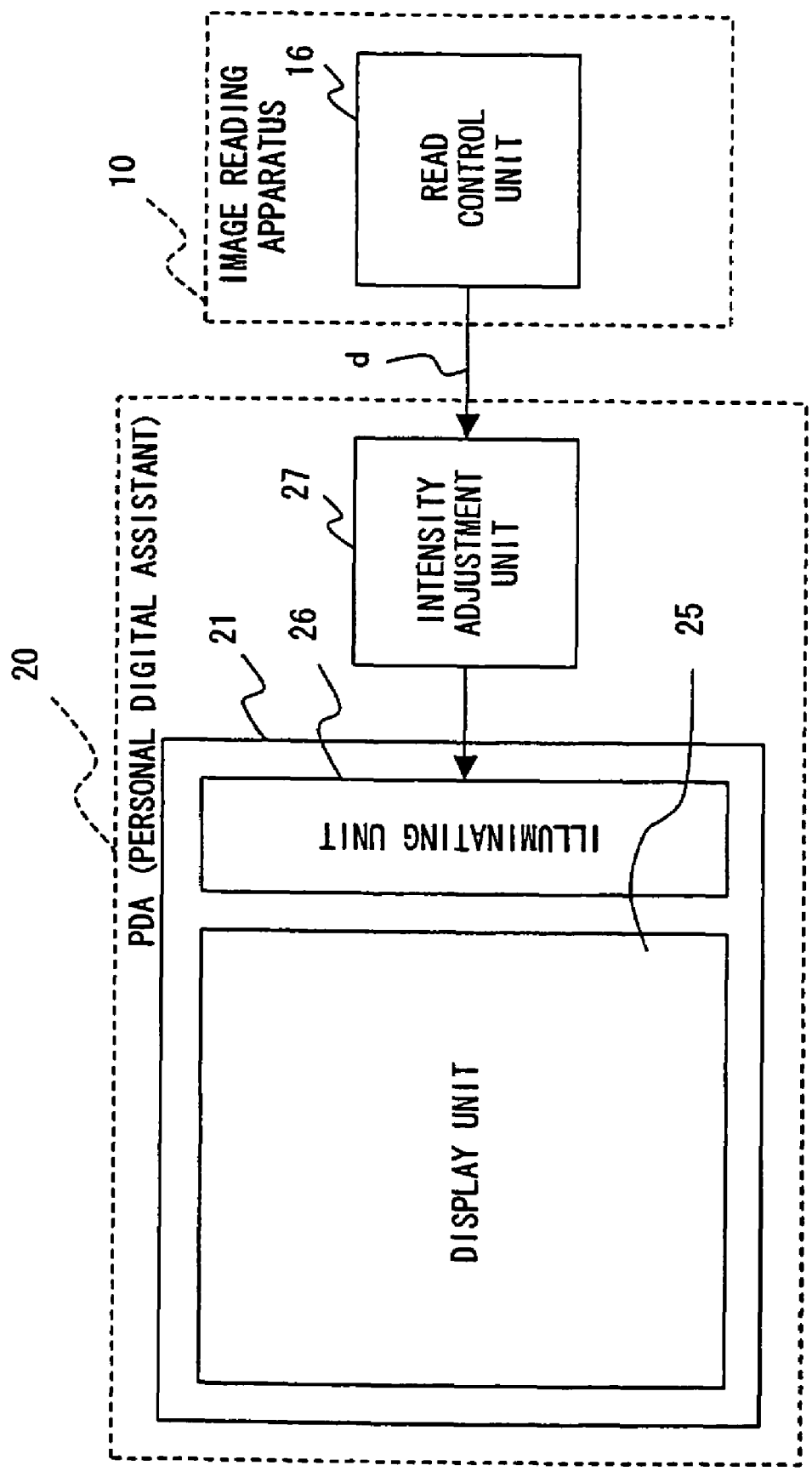

| PROCEDURE COLUMN ~35 | READING STATE COLUMN ~36 | SCREEN DISPLAY COLUMN ~37 | LED ILLUMINATING STATE COLUMN ~38 |
|---|---|---|---|
| 1 | SWITCHING INTO IMAGE READING MODE | MODE DISPLAY | TURN-OFF |
| 2 | AWAITING DETECTION OF ORIGINAL DOCUMENT | MODE DISPLAY | TURN-OFF |
| 3 | DETECTING ORIGINAL DOCUMENT | NOTIFICATION OF DETECTION | BLINKING |
| 4 | AWAITING READ SCANNING | NOTIFICATION OF DETECTION | BLINKING |
| 5 | DURING READING OPERATION | BUSY ICON | TURN-ON |
| 6 | TERMINATING READ | TERMINATING DISPLAY | TURN-OFF |
| 7 | AWAITING INSTRUCTION FROM USER | | |
| 8 | REPEATING 2 THROUGH 5 | | |
| 9 | TERMINATING IMAGE READING MODE | | |

FIG. 9

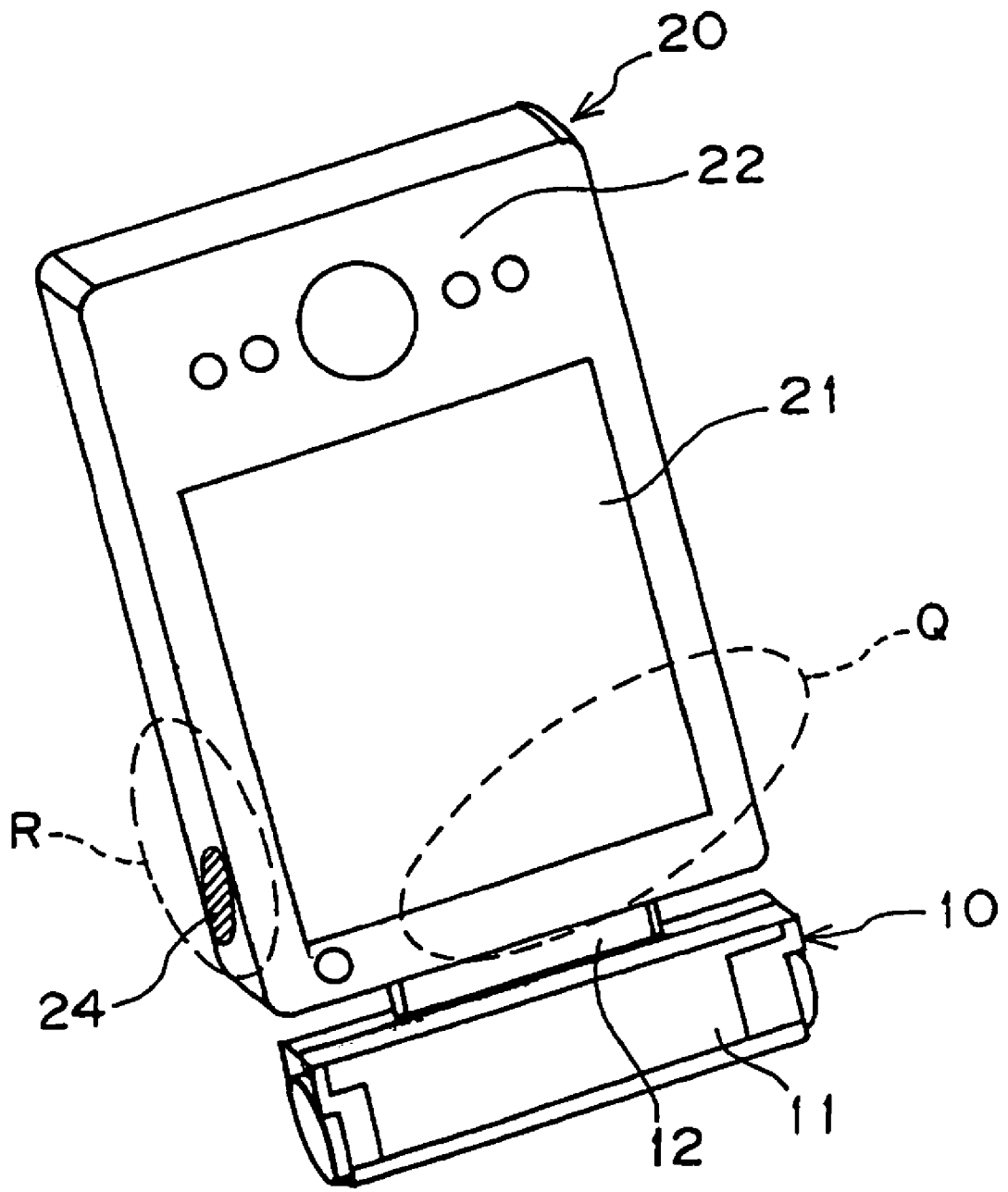
F I G. 1 2 B

| PROCEDURE COLUMN ~45 | READING STATE COLUMN ~46 | INPUT BUTTON COLUMN ~47 | TOUCH PANEL COLUMN ~48 |
|---|---|---|---|
| 1 | SWITCHING INTO IMAGE READING MODE | INVALID | INVALID |
| 2 | AWAITING DETECTION OF ORIGINAL DOCUMENT | INVALID | INVALID |
| 3 | DETECTING ORIGINAL DOCUMENT | INVALID | INVALID |
| 4 | AWAITING START OF READ SCANNING | INVALID | INVALID |
| 5 | READ SCANNING | INVALID | INVALID |
| 6 | TERMINATING READ | INVALID | INVALID |
| 7 | AWAITING OPERATION FROM USER | INVALID | INVALID |
| 8 | REPEATING 2 THROUGH 7 | | |
| 9 | TERMINATING IMAGE READING MODE | VALID | VALID |

F I G. 1 3

IMAGE READING APPARATUS

CROSS REFERENCE TO RELATED APPLICATION

This application is a continuation of application Ser. No. 10/419,183, filed Apr. 21, 2003, now U.S. Pat. No. 6,886,749 now allowed.

BACKGROUND OF THE INVENTION

1. Field of the Invention

The present invention relates to a compact image reading apparatus which is attached to a personal digital assistant (PDA) and reads an image.

2. Description of the Related Art

FIGS. 1A, 1B, and 1C show the configuration of a conventionally well-known compact image reading process apparatus. FIG. 1A shows a PDA 1 which has been widely used these days. The PDA 1 shown in FIG. 1A is provided with an input display device 2 formed by overlapping a touch panel, which occupies substantially the entire front side of the PDA 1, and an LCD (liquid crystal display). The input display device 2 can receive various input by an input pen 3 formed by a thin resin pole, etc. attached to the PDA 1, and can also receive various instructions by a plurality of input buttons 4 arranged below the input display device 2. Normally, the PDA 1 is provided with a card insertion slit 5 at the top. For example, a PC card and a CF card are inserted into the card insertion slit 5.

FIG. 1B shows a card type image scanner 6 which is an ultra-compact image reading apparatus used as attached to the card insertion slit 5 of the PDA 1. The card type image scanner 6 is formed by a scanning unit 7 for reading an image and a connection card unit 8. When the connection card unit 8 is inserted into the card insertion slit 5 of the PDA 1 as indicated by the arrow A shown in FIG. 1B, a compact image reading process apparatus is obtained by the PDA 1 and the card type image scanner 6 incorporated into a unit as shown in FIG. 1C.

FIG. 2A is a side view of the above mentioned image reading process apparatus, and explains the state of reading an image by the above mentioned image reading process apparatus. FIG. 2B is a block diagram showing the configuration of the card type image scanner 6 which is a component of the image reading process apparatus.

First, the PDA 1 is picked up by hand, the scanning unit 7 of the card type image scanner (hereinafter referred to simply as a scanner) 6 is directed downward as shown in FIG. 2A, the scanning unit 7 closely contacts the top surface of a read medium 9 such as paper, etc., the PDA 1 is slid in the read scanning direction indicated by the arrow B, and the scanning unit 7 can read the image on the read medium 9.

The scanning unit 7 of the card type image scanner 6 is provided with an image reading unit 7-1 for optically reading the image on the read medium 9 as shown in FIG. 2B, and converting the optical image data into an analog electric signal, and a transfer amount measuring unit 7-2 for measuring the amount of transfer on the read medium 9 of the image reading unit 7-1.

The connection card unit 8 of the card type image scanner 6 is provided with: an image signal processing unit 8-1 for processing an analog image signal a output from the image reading unit 7-1; a reading control unit 8-2 for drive-controlling the image reading unit 7-1 by outputting a drive signal c to the image reading unit 7-1 based on a transfer amount signal b input from the transfer amount measuring unit 7-2; and a PC card I/F (interface) unit 8-3 for communicating read data and an indication signal with the PDA 1 which is an external information processing device.

As shown in FIG. 2A, read data (image signal) read as a result of the scanning operation is output from the PC card I/F unit 8-3 of the connection card unit 8 to the PDA 1, and sequentially displayed as an image on the input display device 2 of the PDA 1. Therefore, the image data can be read with a check made by the user on the input display device 2 of the PDA 1.

The power supply of mobile information equipment such as the above mentioned PDA 1, etc. is a battery, and it is necessary to continuously use the mobile information equipment for a long time using the battery. However, batteries cannot work for a long time as expected by users, and conventional mobile information equipment often leaves much to be desired because it easily indicates battery exhaustion.

Furthermore, since a scanner is normally attached to the top of the mobile information equipment, the configuration requires picking up the mobile information equipment upside down when the scanner is operated, which sets the correspondence between the user and the mobile information equipment different from the correspondence between them in the normal use of the mobile information equipment. As a result, there has been the problem that the user feels inconvenience when the scanner is incorporated into the mobile information equipment.

Additionally, when the mobile information equipment is provided with a display device such as a liquid crystal display device, etc. as a monitor screen, the user checks a read image on the monitor screen after the image has been completely read by the scanner and a capturing device. While the image is being read, the user pays his or her attention to the reading operation, and does not carefully check the image on the monitor screen. Therefore, although it is not necessary to turn on the backlight of the display device, the backlight is unnecessarily turned on in the conventional technology, thereby accelerating the wasteful power consumption.

SUMMARY OF THE INVENTION

The present invention has been developed to solve the above mentioned problems, and aims at providing an image reading apparatus for use in an image reading process apparatus to be used by attaching a compact image reading apparatus to mobile information equipment with batteries working for a longer time and the apparatus operating conveniently.

To attain this, the image reading apparatus for reading an image on a read medium according to the present invention is to be attached to an information processing device, which includes at least a display device and an intensity adjustment device for adjusting the display intensity of the display device, as freely removable from the device, and includes: a read control device for controlling a read of an image; and a notification device for notifying the intensity adjustment device of the information processing device of a change in display intensity of the display device depending on the state of the read of the image controlled by the read control device.

Thus, during the image reading operation of the image reading apparatus, the unnecessary illumination of the backlight of the display device of the information processing device can be reduced or turned off to reduce the intensity of the display device, thereby successfully providing an image reading apparatus for reducing the power consumption of a power supply built in the information processing device.

Furthermore, the image reading apparatus according to the present invention is an image reading apparatus, attached to and as freely removable from an information processing device, for reading an image on a read medium, and includes: a read control device for controlling a read of an image; and a function block control device for performing the power supply control or the operation clock distribution control on each function block. The function block control device is configured to perform the power supply control or the operation clock distribution control on each function block depending on the state of the read of the image controlled by the read control device.

Thus, depending on the state of a reading operation of the image reading apparatus, the supply of the power supply or the operation clock signal of the information processing device can be limited or stopped on the portion not related to the reading operation. Therefore, an image reading apparatus capable of reducing the power consumption of the power supply built in the conjunctive information processing device can be provided.

In addition, the image reading apparatus for reading an image on a read medium according to the present invention is to be attached to an information processing device, which includes at least a light-emitting device and a display device, as freely removable from the device, and includes: a read control device for controlling a read of an image; and a notification device for notifying the information processing device of the illumination of the light-emitting device or a change in display on the display device depending on the state of the read of the image controlled by the read control device.

The image reading apparatus for reading an image on a read medium according to the present invention is to be attached to an information processing device, which includes at least a display device, as freely removable from the device, and includes: a read control device for controlling a read of an image; and a notification device for notifying the information processing device of a change in display direction of a part or all of the image displayed on the display device depending on the state of the read of the image controlled by the read control device.

Thus, depending on the state of a reading operation of the image reading apparatus, the direction of the notification display of the information processing device can be changed into a user convenient direction, the lighting-up notification of a lamp can be given, or a notification alarm can be given, thereby successfully providing a user-convenient image reading process apparatus.

The image reading apparatus for reading an image on a read medium according to the present invention is to be attached to an information processing device, which includes at least an input device, as freely removable from the device, and includes: a read control device for controlling a read of an image; and a notification device for notifying the information processing device of a part or all of input by the input device to be nullified depending on the state of the read of the image controlled by the read control device.

Thus, depending on the state of a reading operation of the image reading apparatus, an unnecessary inputting process is invalidated during the image reading operation, and the information processing device during the image reading operation, that is, the scanner can be more freely picked up by hand, thereby successfully providing a user-convenient image reading process apparatus.

The image reading apparatus for reading an image on a read medium according to the present invention is to be attached to an information processing device, which includes at least a display device and an intensity adjustment device for adjusting the display intensity of the display device, as freely removable from the device, and includes: a read control device for controlling a read of an image; and a notification device for notifying the intensity adjustment device of the information processing device of a reduction change in display intensity of the display device during the image reading operation.

Thus, the use of the power supply to each function block is variably controlled depending on the state of a reading operation, and the using time can be extended to the longest possible time length without wasting the battery.

BRIEF DESCRIPTION OF DRAWINGS

FIG. 4 is a block diagram showing the function of the image reading process apparatus which is an image reading apparatus incorporated into a PDA according to the first embodiment of the present invention;

FIG. 9 is a comprehensible list showing the correspondence between the image reading state in the image reading process apparatus and the screen display and the illuminating state of the LED of the corresponding LCD device according to the fourth embodiment of the present invention;

FIG. 12B is an oblique view of the image reading process apparatus and explains the operating state of the image reading process apparatus;

FIG. 13 is a comprehensible list of the image reading state and the corresponding control of the valid/invalid input button and touch panel in the image reading process apparatus according to the sixth embodiment of the present invention.

DESCRIPTION OF THE PREFERRED EMBODIMENTS

The embodiments of the present invention are described below by referring to the attached drawings.

Figure 1A:
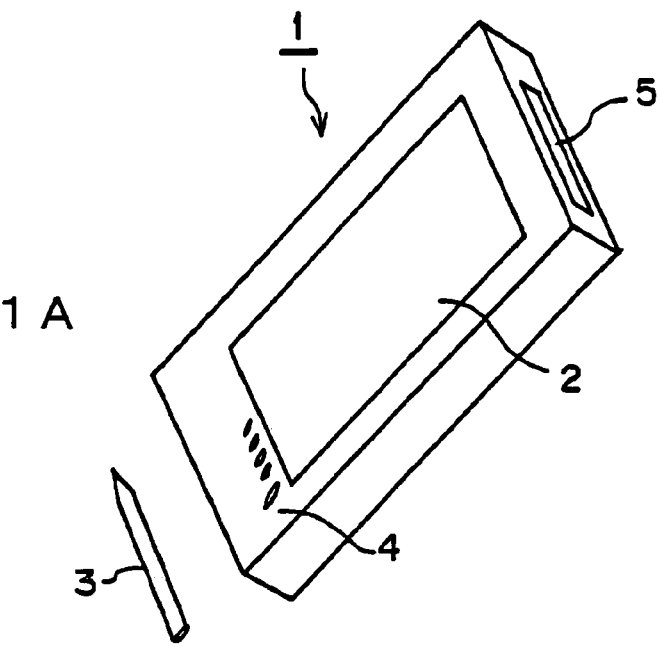
FIGS. 1A, 1B, and 1C show the configuration of a conventional compact image reading process apparatus.
Figure 1B:
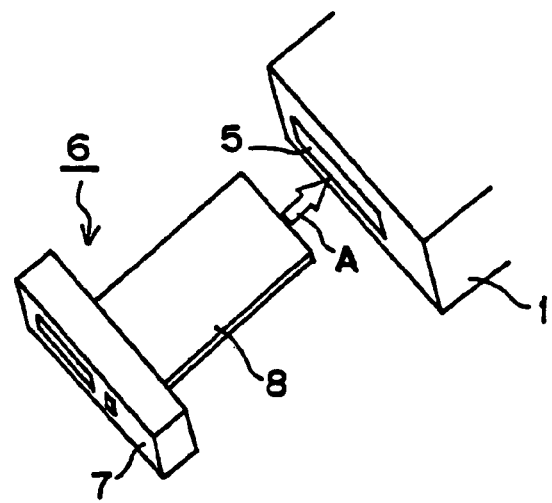
Figure 1C:
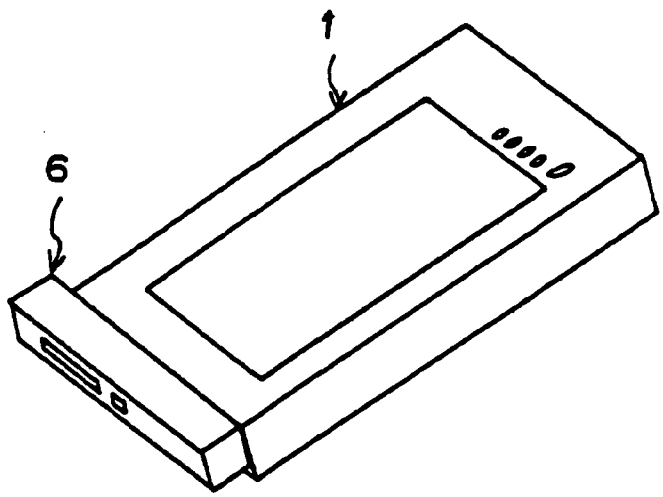
Figure 2A:
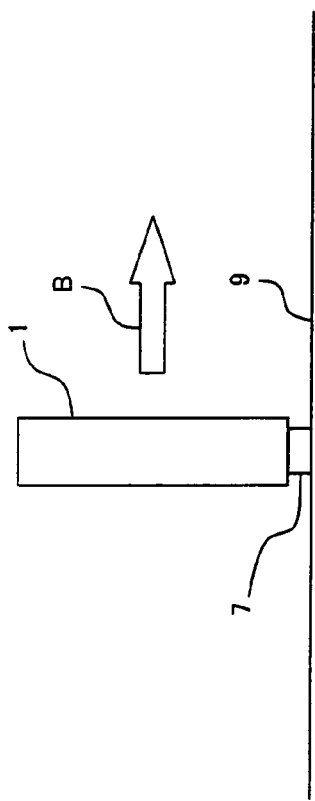
FIG. 2A is a side view of the conventional compact image reading apparatus and explains the state of reading an image by the conventional compact image reading process apparatus.
Figure 2B:
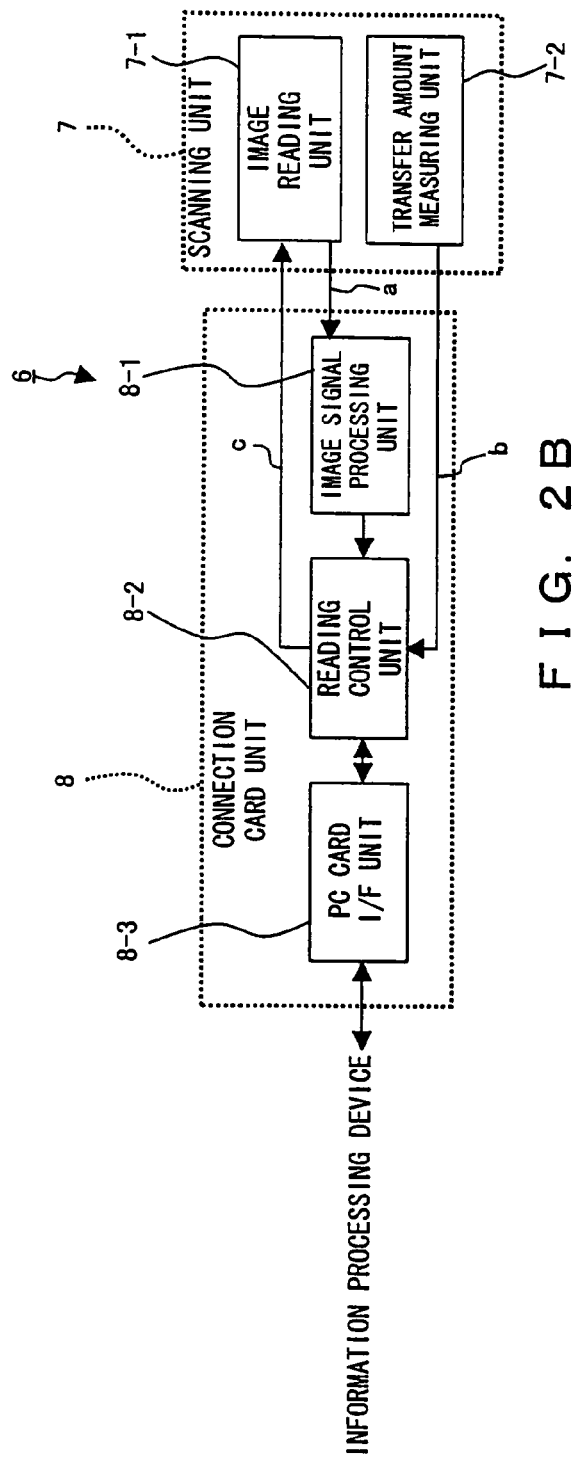
FIG. 2B is a block diagram showing the configuration of the card type image scanner which is a component of the image reading process apparatus.
Figure 3A:
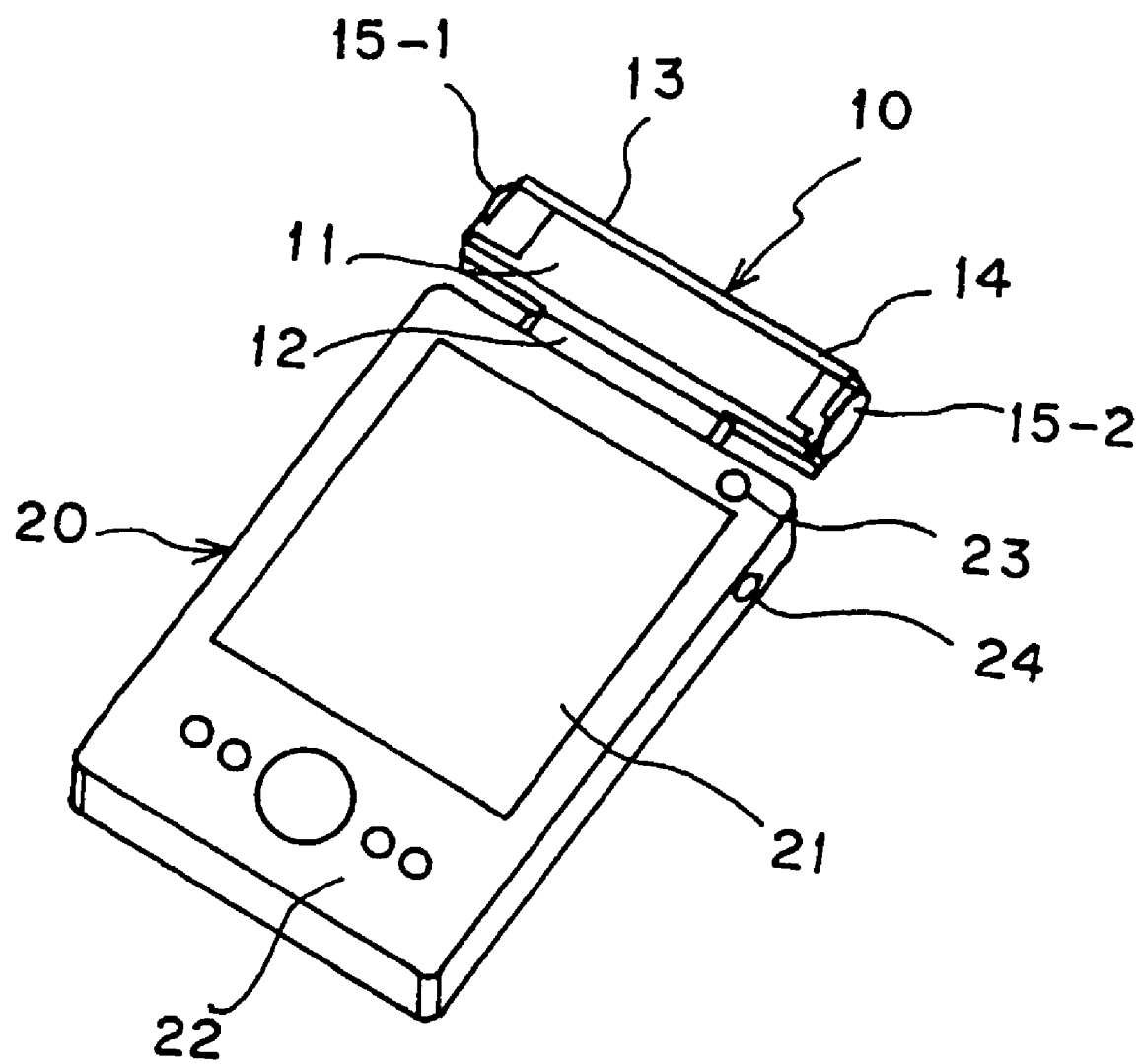
FIG. 3A is an oblique view showing the configuration of the image reading process apparatus which is obtained by attaching the image reading apparatus to the mobile information equipment as an incorporated unit.
Figure 3B:
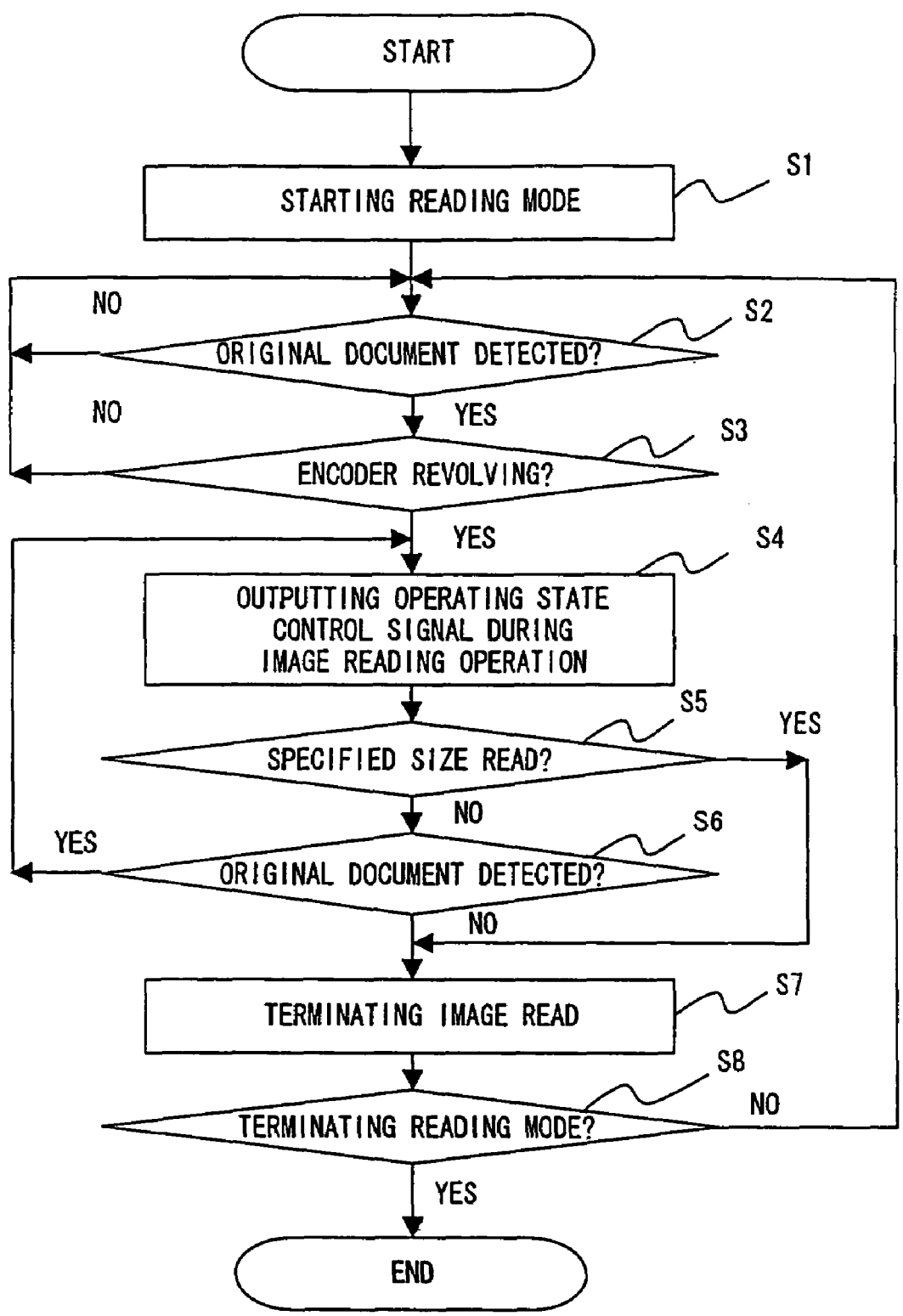
FIG. 3B is a flowchart showing the sequence of the basic reading operation performed with the configuration shown in FIG. 3A.

FIG. 3A is an oblique view showing the configuration of the image reading process apparatus which is obtained by attaching the image reading apparatus to the mobile information equipment as an incorporated unit. FIG. 3B is a flowchart showing the sequence of the basic reading operation performed with the configuration shown in FIG. 3A.

An image reading apparatus 10 shown in FIG. 3A comprises a scanner unit 11 and a connection card unit 12. Provided on the image scanning surface which is the reverse side of the view of the scanner unit 11 shown in FIG. 3A are a reading line scanner 13 arranged as substantially covering the longitudinal direction, and an original document detection sensor 14 arranged near the end portion of the reading line scanner 13. The scanner unit 11 is provided with rollers 15 (15-1 and 15-2) on both ends of the longitudinal direction. The rollers 15 are provided with cooperative encoders not shown in FIG. 3A.

The image reading apparatus 10 is attached as incorporated into a PDA 20 which is a mobile information processing device by inserting the connection card unit 12 into the card slit provided on top of the PDA 20. An image reading control unit, an operation state control signal output unit for outputting an operation state control signal to each module unit depending on the control state of the image reading control unit, etc. are mounted in the connection card unit 12.

Another PDA 20 is provided with an input display unit 21 in front as occupying a large area, various input buttons 22 arranged below the input display unit 21, and an LED (light emitting diode) 23 arranged near the upper right corner of the input display unit 21. Furthermore, an input button 24 for power supply is provided up on the right side. The above mentioned input display unit 21 is configured by the touch panel overlapping the LCD device.

The operation of the basic reading process performed with the above mentioned configuration is described below by referring to the flowchart shown in FIG. 3B. This process is performed by the cooperation between the control unit of the image reading apparatus 10 and the control unit of the PDA 20. The user touches the input display unit 21 using an exclusive pen or using the input button 22 to input the size of an image to be read, and process is performed after inputting an image read instruction.

A reading mode is set, and the process in the reading mode is started (S1). When the process in the reading mode is started, it is first determined whether or not an original document (a read medium such as paper) has been detected (S2). In this process, it is determined that there is an original document if the quantity of a reflected light incident to the photosensor of the original document detection sensor 14 is equal to or larger than a predetermined amount. If the quantity is smaller than the predetermined amount, it is determined that there are no original documents.

If no original documents are detected (NO in S2), the detection of an original document is awaited. When an original document is detected (YES in S2), it indicates that the scanning surface on which the reading line scanner 13 of the scanner unit 11 of the image reading apparatus 10 is set tightly contacting the original document. In this case, it is continuously determined whether or not the encoder is being driven (S3).

In this process, the output from the encoder operating in conjunction with the roller 15 is monitored. When the output of the encoder does not indicate revolution (NO in S3), control is returned to step S2, and the processes in S2 and S3 are repeated.

If the output from the encoder indicates revolution in the process in S3 (YES in S3), the roller 15 of the image reading apparatus 10 pressed onto the original document is revolving, that is, the scanning surface of the image reading apparatus 10 is traversing the original document. Therefore, in this case, while the reading line scanner 13 is reading an image, an operation state control signal indicating that the image is being read is output (S4).

According to the output operation state control signal, the display intensity of the input display unit 21 and display direction of the image displayed on the input display unit 21 of the PDA 20 are controlled as described later in detail. The supply of power and a clock signal to the image reading apparatus 10 and the PDA 20 can also be controlled. Thus, according to the operation state control signal, the operations of various function modules are controlled.

Subsequently, it is determined whether or not a read from a read area of a specified size has been completed (S5). In this process, the accumulated value of the number of revolutions of the encoder is referred to, and it is determined whether or not the accumulated value corresponds to the specified size of the read area.

If the read from the read area of the specified size has not been completed (NO in S5), then an original document is detected to determine again whether or not there is an original document (S6). If an original document is detected, there is an original document area from which data is to be read (YES in S6). In this case, control is returned to the process in step S4, and the processes in S4 through S6 are repeated. Thus, the read from a specified read area can be performed.

If no original documents are detected in the process in S6 (NO in S6), then the reading line scanner 13 has gone out of the surface of an original document, or the user has picked up the PDA 20 to detach the reading line scanner 13 from the surface of an original document. In this case, the original document read completion process is performed (S7). In this process, the output of the operation state control signal is stopped, and furthermore, for example, read image data is stored in the storage device.

When the read from the specified read area is completed (Yes in S5), control is immediately passed to step S7. After the process in S7, it is determined whether or not the reading mode has been completed (S8). This process is an inputting operation by touching the input display unit 21 or using the input button 22 to determine whether or not an instruction to terminate the reading mode has been issued by the user.

If there is no instruction to terminate the reading mode (NO in S8), control is returned to step S2, and the above mentioned sequential process from the detection of an original document is repeated. On the other hand, if an instruction to terminate the reading mode is specified (YES in S8), then the original document reading process terminates.

FIG. 4 is a block diagram showing the function of the image reading process apparatus in which the image reading apparatus 10 and the PDA 20 are incorporated into one unit basically functioning as described above according to the first embodiment. In the block diagram of the functions as shown in FIG. 4, the function blocks relating to the similar functions to the those of the hardware configuration shown in FIG. 3A are assigned the reference numerals corresponding to those assigned in the hardware configuration shown in FIG. 3A.

As shown in FIG. 4, the function according to the first embodiment of the image reading process apparatus in which the image reading apparatus 10 and the PDA 20 are incorporated into one unit is formed by: a read control unit 16 as a read control device for controlling a read of an image by the image reading apparatus 10; a display unit 25 as a display device for display-driving the LCD device of the input display unit 21 of the PDA 20; an illuminating unit 26 for turning on the backlight of the input display unit 21; and an intensity adjustment unit 27 as an intensity adjustment device for adjusting the intensity of the backlight by controlling the illuminating unit 26.

Thus, the PDA 20 for performing the process of reading an image by being incorporated into the image reading apparatus 10 is provided with a backlight for the LCD device for display of a result of an input image. In the normal operation of the PDA 20, the turned-on backlight allows a screen displayed on the LCD device to be easily checked.

However, if the lighting time of the backlight is long, the battery becomes exhausted the sooner. Normally, the user checks an input result of an image by picking up the PDA 20 each time an image is read by the image reading apparatus 10 and checking the screen displayed on the LCD device, but does not check the screen during an image reading operation. That is, since the user normally does not check an image input screen during the image reading operation, it is not necessary to turn on the backlight of the LCD device.

Therefore, according to the present embodiment, if the intensity adjustment unit 27 of the PDA 20 receives an operation state control signal d (refer to the process in S4 shown in FIG. 3B), which is a notification that an image is being read output from the read control unit 16 during the image (original document) reading operation, through a card input/output interface as a notification device although it is not shown in the attached drawings, the intensity adjustment unit 27 controls the illuminating unit 26 to reduce the intensity of the backlight of the LCD device display-driven by the display unit 25, or cut off the power supply of the backlight according to the received notification.

Thus, the consumption of a current used for the LCD display during while the image is being scanned is reduced, and the consumption of the battery built in the PDA 20 can be reduced. Thus, according to the present embodiment, the power supply to the backlight of the PDA 20 is reduced or cut off during the image scanning to save power consumption.

Figure 5:
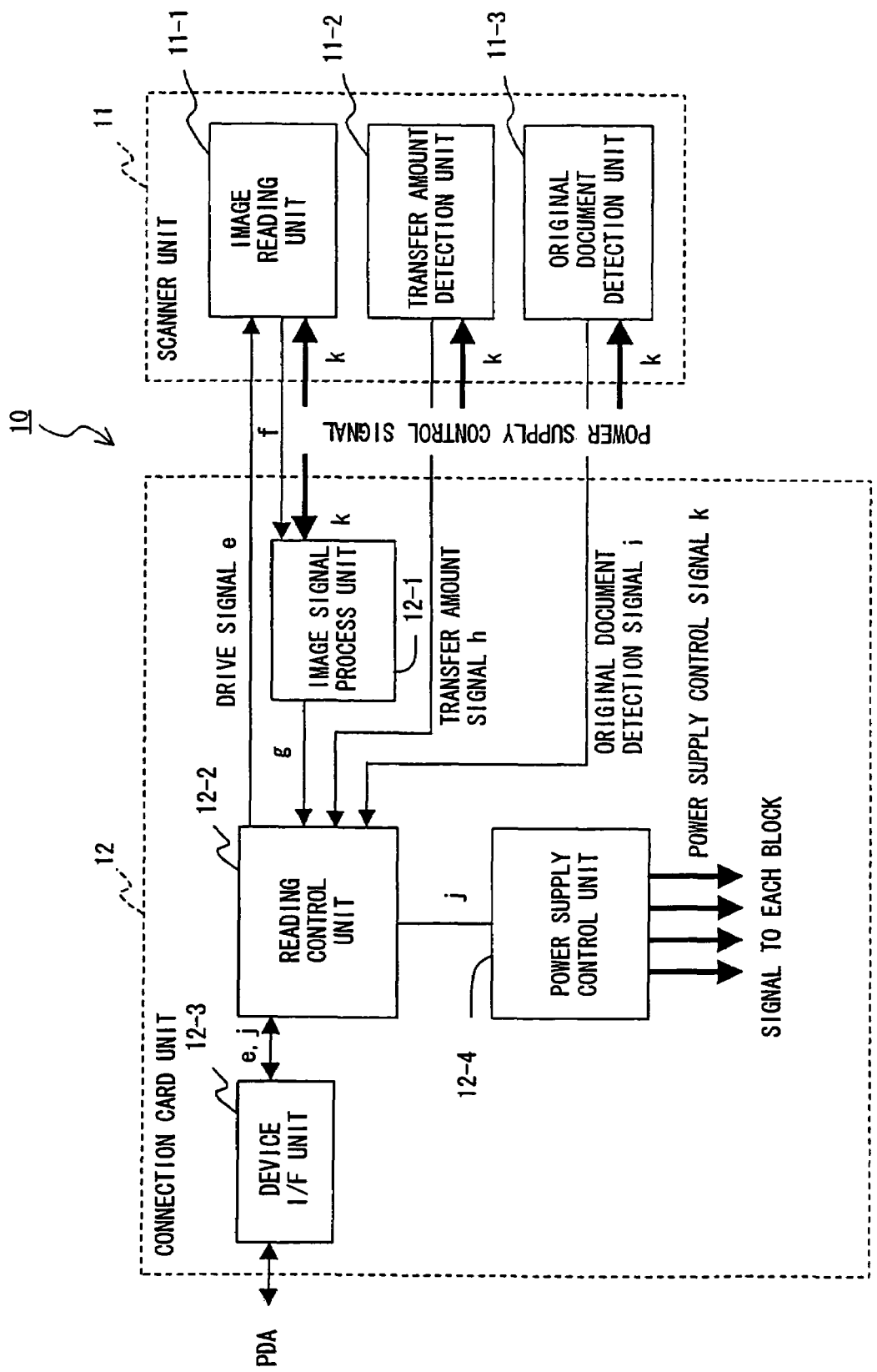
FIG. 5 is a block diagram showing the configuration of the image reading apparatus according to the second embodiment of the present invention.

FIG. 5 is a block diagram of the function of the image reading apparatus 10 according to the second embodiment. Also in FIG. 5, the function blocks relating to the similar functions to the those of the hardware configuration shown in FIG. 3A are assigned the reference numerals corresponding to those assigned in the hardware configuration shown in FIG. 3A.

As shown in FIG. 5, the function block of the image reading apparatus 10 comprises an image reading unit 11-1 of the scanner unit 11, a transfer amount detection unit 11-2, an original document detection unit 11-3, an image signal process unit 12-1 of the connection card unit 12, a reading control unit 12-2 as a read control device, a device I/F unit 12-3, and a power supply control unit 12-4. Actually, the scanner unit 11 also comprises an image signal process unit functioning in conjunction with the image signal process unit 12-1 of the connection card unit 12, but they are shown in FIG. 5 as included in the image signal process unit 12-1 of the connection card unit 12.

The image reading unit 11-1 is driven according to a drive signal e output from the reading control unit 12-2, obtains an image signal obtained by scanning an image by the reading line scanner 13, and outputs the obtained analog image signal f to the image signal process unit 12-1. The image signal process unit 12-1 converts the analog image signal f input from the image reading unit 11-1 into a digital image signal g, and outputs the digital image signal g to the reading control unit 12-2.

The transfer amount detection unit 11-2 obtains the output from the encoder functioning in conjunction with the roller 15, detects the number of revolutions of the roller 15 from the obtained output of the encoder, that is, an amount of transfer of the reading line scanner 13, and outputs the detected amount of transfer as a transfer amount signal h to the reading control unit 12-2.

The original document detection unit 11-3 obtains the output from the original document detection sensor 14, and outputs an original document detection signal i to the reading control unit 12-2 if the obtained output indicates the detection of an original document.

The reading control unit 12-2 recognizes that the image is being read according to the digital image signal g input from the image signal process unit 12-1, determines whether or not a read scanning operation on the area of a size specified by the user has been completed according to the transfer amount signal h input from the transfer amount detection unit 11-2, determines whether or not there is an original document according to the original document detection signal i input from the original document detection unit 11-3, and either outputs the drive signal e to the image reading unit 11-1 based on the recognition and the determination, and outputs the digital image signal g and the reading state signal j input from the image signal process unit 12-1 to the device I/F unit 12-3, or outputs the reading state signal j to the power supply control unit 12-4.

The device I/F unit 12-3 outputs the digital image signal g and the reading state signal j input from the reading control unit 12-2 to the PDA 20.

Then, the power supply control unit 12-4 selectively outputs a power supply control signal k to each block according to the reading state signal j input from the reading control unit 12-2.

Figure 6:
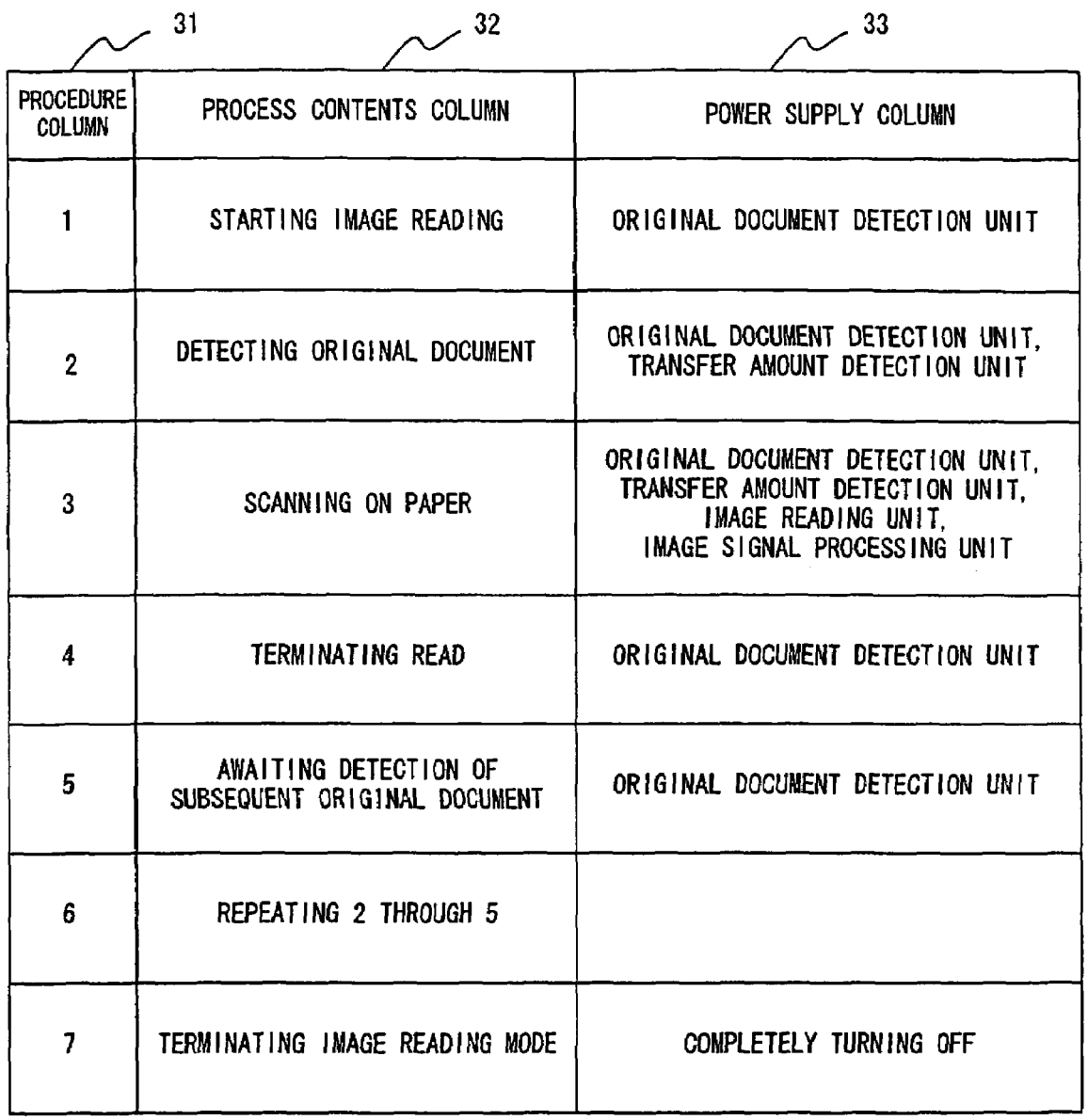
FIG. 6 is a comprehensible list showing the correspondence between the contents of the process procedure of each function block and the contents of the power supply control with the configuration of the image reading apparatus according to the second embodiment of the present invention.

FIG. 6 is a comprehensible list of the process procedures of each function block with the above mentioned configuration, the process contents shown according to the reading state signal j output from the reading control unit 12-2 depending on the process procedures, and the contents of the power supply control performed by the power supply control unit 12-4 based on the process contents.

FIG. 6 sequentially shows from left end to right a procedure column 31, a process contents column 32, and a power supply column 33. The procedure column 31 shows a procedure number, the process contents column 32 shows process contents, the power supply column 33 shows the name of a function block of a power supply destination. The sequential process of reading an image as indicated by the procedure column 31 and the process contents column 32 shown in FIG. 6 comprises: a procedure 1 of starting a read of an image; a procedure 2 of detecting an original document; a procedure 3 of scanning on paper; a procedure 4 of completing reading; a procedure 5 of awaiting subsequent original documents; a procedure 6 of repeating the procedures 2 through 5 when an original document is detected; and a procedure 7 of terminating an image reading mode. The series of sequential reading processes are performed in the communications between a user and a user interface.

Depending on the reading state in the series of sequential reading process, that is, depending on the process contents indicated in the process contents column 32, the power supply control unit 12-4 supplies power only to the function blocks shown in the power supply column 33 according to the power supply control signal k. That is, it does not supply power to other function blocks.

In the example shown in FIG. 6, power is supplied only to the original document detection unit 11-3 in the procedure 1 of starting a read of an image; only to the original document detection unit 11-3 and transfer amount detection unit 11-2 in the procedure 2 of detecting an original document; only to the original document detection unit 11-3, the transfer amount detection unit 11-2, the image reading unit 11-1, and the image signal process unit 12-1 in the procedure 3 of scanning on paper; only to the original document detection unit 11-3 in the procedure 4 of completing reading; and only to the original document detection unit 11-3 in the procedure 5 of awaiting subsequent original documents. In the procedure 6 of repeating the procedures 2 through 5, the above mentioned processes are repeated. In the procedure 7 of terminating an image reading mode, power supply to all function blocks is cut off.

Thus, electric power can be saved by controlling the power supply to each function block depending on the image reading state, thereby successfully providing an image reading apparatus which realizes less battery exhaustion.

Figure 7:
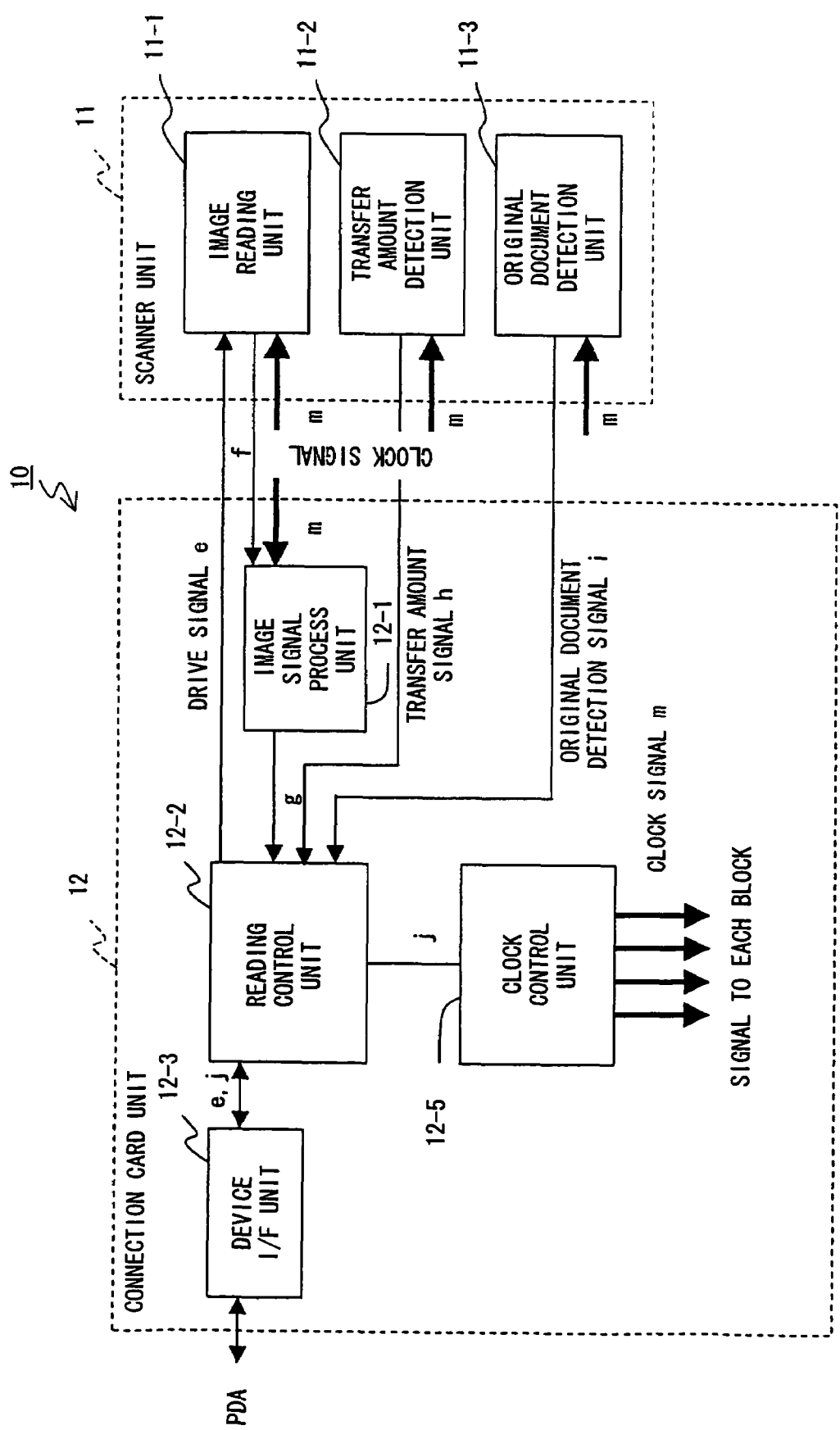
FIG. 7 is a block diagram of the function of the image reading apparatus according to the third embodiment of the present invention.

FIG. 7 is a block diagram showing the function of the image reading apparatus 10 according to the third embodiment. Also in FIG. 7, the function blocks relating to the similar functions to the those of the hardware configuration shown in FIG. 3A are assigned the reference numerals corresponding to those assigned in the hardware configuration shown in FIG. 3A.

Furthermore, in FIG. 7, the power supply control unit 12-4 of the function block in FIG. 5 is replaced with a clock control unit 12-5, and a clock signal m transmitted from the clock control unit 12-5 to each function block is controlled depending on the image reading state.

The processing operations are almost the same except that the power supply control unit 12-4, the power supply control signal k, and the power supply shown in FIGS. 5 and 6 are respectively replaced with the clock control unit 12-5, the clock signal m, and the supply of a clock signal.

Thus, by controlling a clock signal to be supplied to each function block depending on the image reading state, the power consumption can be reduced and the electric power can be saved by stopping the supply of an operation clock to a function block not in operation, and reducing the speed of a clock. Thus, a image reading apparatus can be provided with less battery exhaustion.

Since it is desired that a mobile scanner (image reading apparatus) can be the smallest possible, the scanner is to be free of a lamp, an indicator, an alarm device, etc.

However, with the above mentioned simple configuration, the scanner cannot issue a notification to a user as to whether or not an original document has been detected, and the user cannot start a read scanning operation. Furthermore, although a read scanning operation can be started, no image is possibly obtained. Additionally, although an image reading operation is interrupted by a time-out, memory error, etc., the notification cannot be issued to the user, and the user continues the read scanning operation without knowing the error, thereby extending the trouble.

Therefore, during the detection of an original document and the image reading operation, the user has to be informed of the operation state to correctly read the image. The embodiment of the image reading process apparatus with a compact image reading apparatus realized and with a notification appropriately issued is described below as the fourth embodiment of the present invention.

Figure 8A:
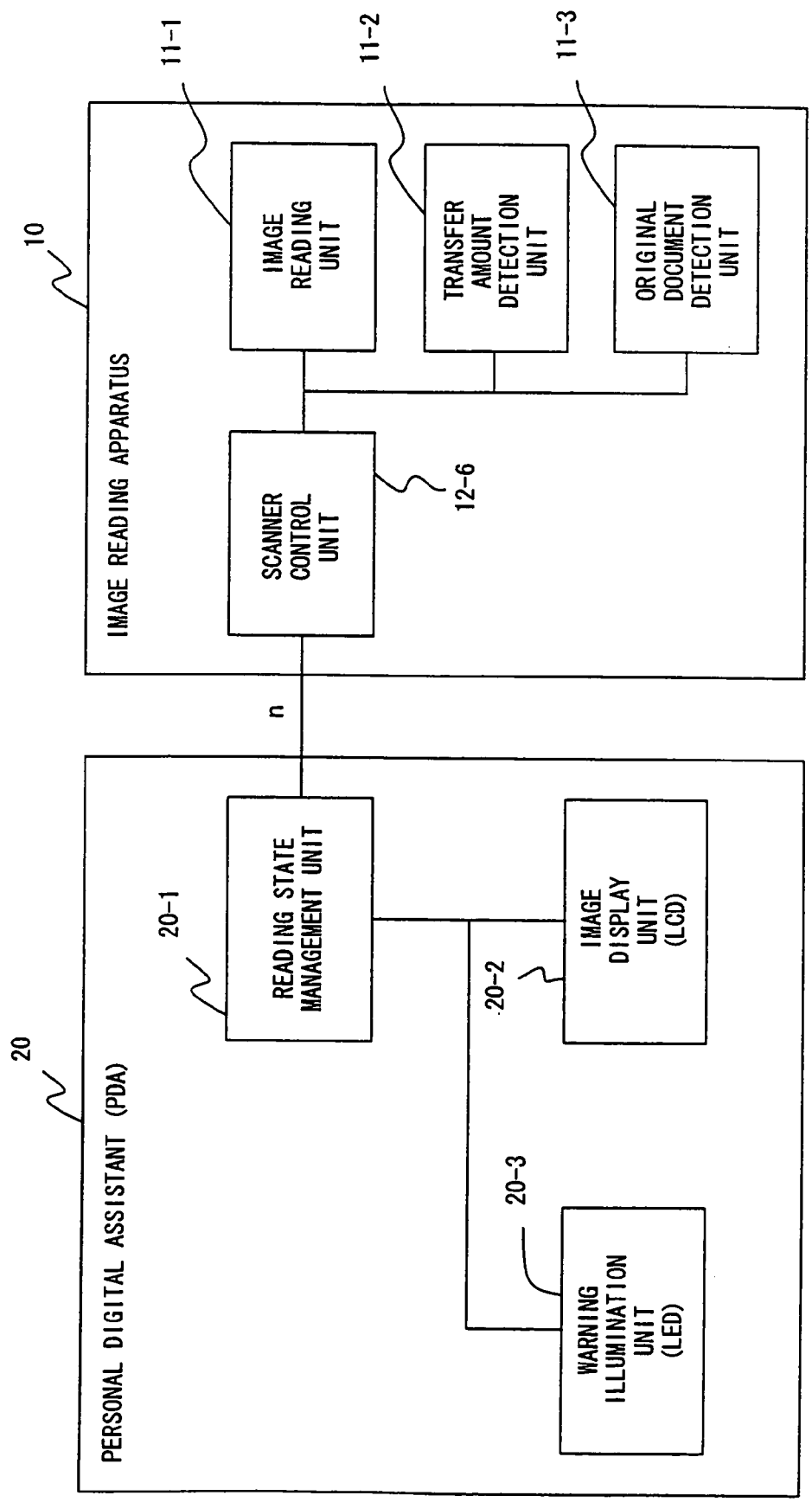
FIG. 8A is a block diagram of the function of the image reading process apparatus according to the fourth embodiment of the present invention.
Figure 8B:
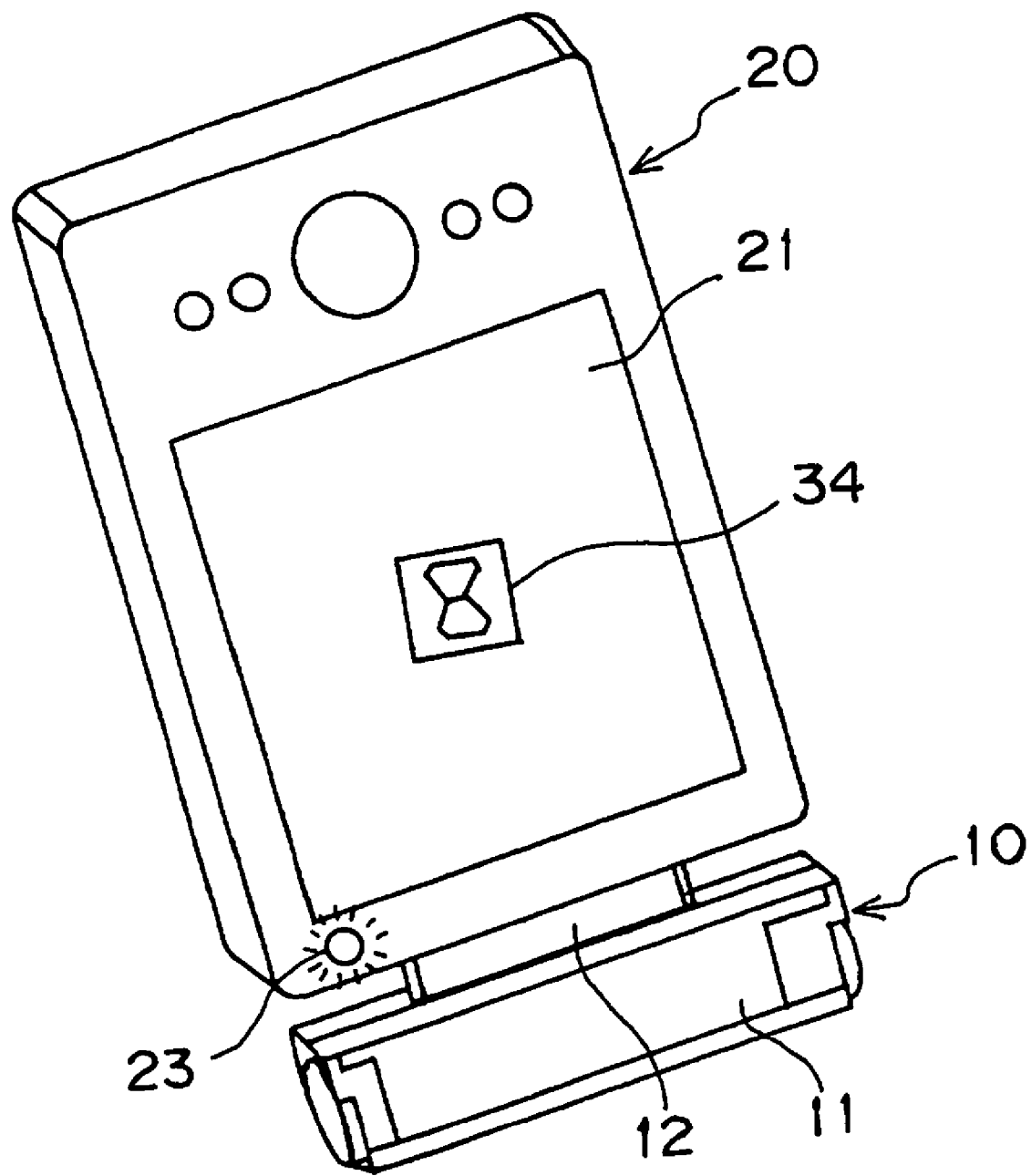
FIG. 8B is an oblique view of the image reading process apparatus and explains the operating state of the image reading process apparatus.

FIG. 8A is a block diagram of the function of the image reading process apparatus according to the fourth embodiment of the present invention. FIG. 8B is an oblique view of the image reading process apparatus and explains the operating state of the image reading process apparatus. The appearance shown in FIG. 8B shows the image reading process apparatus in which the image reading apparatus 10 is attached to the top of the PDA 20 shown in FIG. 3A into an incorporated unit with the scanning surface of the image reading apparatus 10 directed downward.

As shown in FIG. 8A, the function block of the image reading apparatus 10 comprises the image reading unit 11-1 of the scanner unit 11, the transfer amount detection unit 11-2, the original document detection unit 11-3, a scanner control unit 12-6, a reading state management unit 20-1 of the PDA 20, an image display unit 20-2, and a warning illumination unit 20-3.

The reading state management unit 20-1 of the PDA 20 monitors a reading state signal n of an image notified by the scanner control unit 12-6 of the image reading apparatus 10, and controls the image display unit 20-2 and the warning illumination unit 20-3 depending on the reading state. The image display unit 20-2 is the function block of display-driving the LCD device of the input display unit 21, and the warning illumination unit 20-3 is a function block for turning on, blinking-driving, and turning off the LED 23.

FIG. 9 is a comprehensible list of the process procedure of each of the above mentioned function blocks with the above mentioned configuration, the contents of the reading state indicated by the reading state signal n notified from the scanner control unit 12-6 depending on the process procedure, the display process performed by the image display unit 20-2 under the control by the reading state management unit 20-1 depending on the contents of the reading state, and the lighting process performed by the warning illumination unit 20-3.

FIG. 9 shows sequentially from left to right a procedure column 35, a reading state column 36, a screen display column 37, and an LED illuminating state column 38. The procedure column 35 indicates a procedure number, the reading state column 36 indicates the operation contents of the image reading apparatus 10 shown by the reading state signal n notified from the scanner control unit 12-6, the screen display column 37 indicates the contents of the screen displayed on the LCD device of the input display unit 21 of the PDA 20, and the LED illuminating state column 38 also indicates the illuminating state of the LED 23 of the PDA 20.

As shown in FIG. 9, in a procedure 1 of switching a reading state into an image reading mode, a switched-to mode is displayed on the screen of the LCD device, and the LED 23 is turned off. In a procedure 2 of awaiting the detection of an original document, the mode is displayed on the screen, and the LED 23 is turned off. In a procedure 3 of detecting an original document, a detection notification is displayed on the screen, and the LED 23 is blinking. In a procedure 4 of awaiting the start of read scanning, a detection notification is displayed on the screen, and the LED 23 continued blinking. In a procedure 5 of read scanning, a Busy icon 34 designed as a sandglass is displayed on the LCD device of the input display unit 21 as shown in FIG. 8B, and the LED 23 is switched from blinking to lighting up. In a procedure 6 of terminating a reading operation, the display on the screen terminates, and the LED 23 is turned off.

The next procedure 7 of awaiting an instruction from a user is followed by a procedure 8 or 9. In the procedure 8, the procedures 2 through 7 are repeated by the operation of scanning an image by the user. If the user issues a terminate instruction, the image reading mode terminates in the procedure 8. When an alarm device such as a buzzer, etc. is provided for the PDA 20, the alarm device can notify the user of a reading state in addition to the screen display on the LCD device and the lighting-up of the LED 23.

Thus, since the image reading apparatus 10 can notify a user of a reading state of an image using any of the display device, the lamp, the alarm device, etc. although it is a compact device without a display device, a lamp, an alarm device, etc. of the PDA functioning in conjunction with the apparatus, the user can easily be informed of the read starting time, and that the read scanning is being performed without any trouble.

Therefore, the user can prevent from running into trouble of obtaining no images due to bad timing or performing unnecessary processes by continuing insignificant read scanning without knowing that the image read has been interrupted by time-out, a memory error, etc., thereby successfully providing a convenient image reading process apparatus.

During the image reading operation by the above mentioned image reading process apparatus, the PDA 20 functioning in conjunction with the image reading apparatus 10 is set upside down unlike in the normal use state. Therefore, the display screen of the LCD device viewed from the user during the image reading operation displays the image upside down.

Normally, the user checks the preview display image whether or not the image read during the image reading operation or immediately after performing the image reading operation is correctly read. However, if the image is displayed upside down, it is hard to correctly check the image. If the PDA 20 is picked up again each time for correct checking, the time and operation are additionally required each time, and the user feels inconvenience in continuously reading a plurality of images. Described below is the image reading process apparatus which is free of the above mentioned problems according to the fifth embodiment of the present invention.

Figure 10:
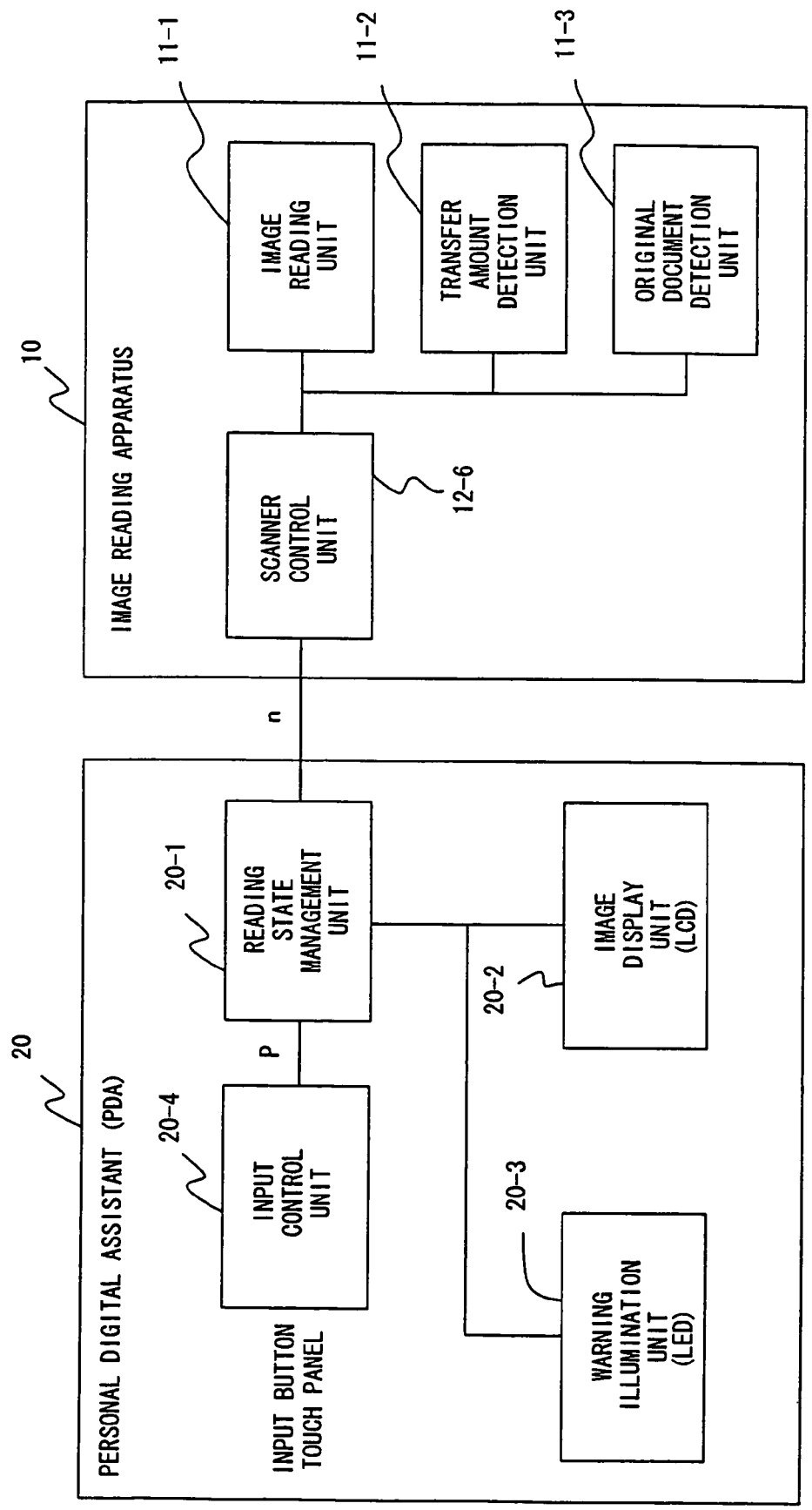
FIG. 10 is a block diagram showing the function of the image reading process apparatus according to the fifth embodiment of the present invention.

FIG. 10 is a block diagram showing the function of the image reading process apparatus according to the fifth embodiment of the present invention. The function block shown in FIG. 10 is obtained by further adding an input control unit 20-4 to the PDA 20 side of the function block of the image reading process apparatus shown in FIG. 8. The input control unit 20-4 notifies the reading state management unit 20-1 of an input event p from the touch panel of the input display unit 21 or the input buttons 22.

The reading state management unit 20-1 controls the image display unit 20-2 based on the contents of the reading state signal n input from the scanner control unit 12-6 and the input event p input from the input control unit 20-4, and changes the direction of the screen displayed on the LCD device of the input display unit 21.

Figure 11:
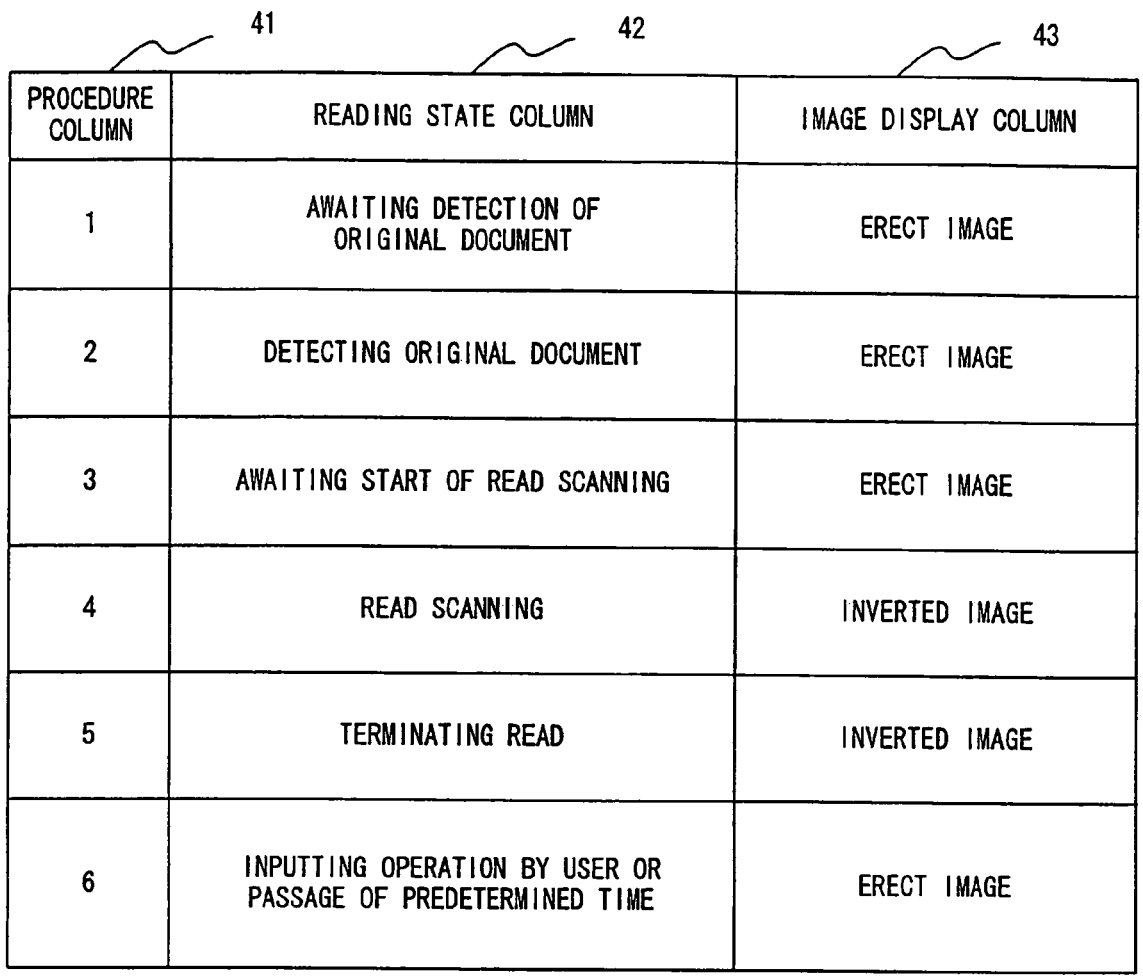
FIG. 11 is a comprehensible list showing the correspondence between the image reading state in the image reading process apparatus and the direction of the image displayed on the corresponding LCD device according to the fifth embodiment of the present invention.

FIG. 11 is a comprehensible table of the process procedure by each of the above mentioned function blocks with the above mentioned configuration, the contents of the reading state indicated by the reading state signal n transmitted from the scanner control unit 12-6 corresponding to the process procedure, or the input event input from the input control unit 20-4, and the display process performed by the image display unit 20-2 under the control by the reading state management unit 20-1 corresponding to the above mentioned information.

FIG. 11 shows sequentially from left to right a procedure column 41, a reading state column 42, and an image display column 43. The procedure column 41 contains a procedure number, the reading state column 42 contains the reading state signal n transmitted from the scanner control unit 12-6 or the contents of the input event p, and the image display column 43 contains the direction of the image displayed on the LCD device of the input display unit 21.

As shown in FIG. 11, in a procedure 1 of awaiting the detection of an original document, the image is displayed as an erect image. In a procedure 2 of detecting an original document, the image is an erect image, and in a procedure 3 of awaiting the start of read scanning, the image is an erect image, but in a procedure 4 of read scanning, the image is set upside down. In a procedure 5 of terminating the reading operation, the image is also set upside down. When there is an inputting operation of the user in a procedure 6, or when a predetermined time passes, the image is returned to the erect image.

Thus, depending on the use state, the direction of the image displayed on the LCD device is set upside down from an erect image during and immediately after the image reading operation. Therefore, the user can easily check a preview image as is in the natural display state during and immediately after the image reading operation without the trouble of picking up again the PDA 20, thereby providing a convenient image reading process apparatus.

The information processing device such as the PDA 20, etc. is provided with various input buttons for user inputting operations, and the display device is provided with a touch panel. However, these units are provided for convenience in using the information processing device in an erect state, and are not designed to consider the upside down state.

Therefore, there can be the case in which a wrong inputting operation is performed and an input event occurs by an input button or a touch panel in the position of the user fingers, thereby causing a malfunction of the image reading apparatus. Described below is the image reading process apparatus which is free of the above mentioned problems according to the sixth embodiment of the present invention.

Figure 12A:
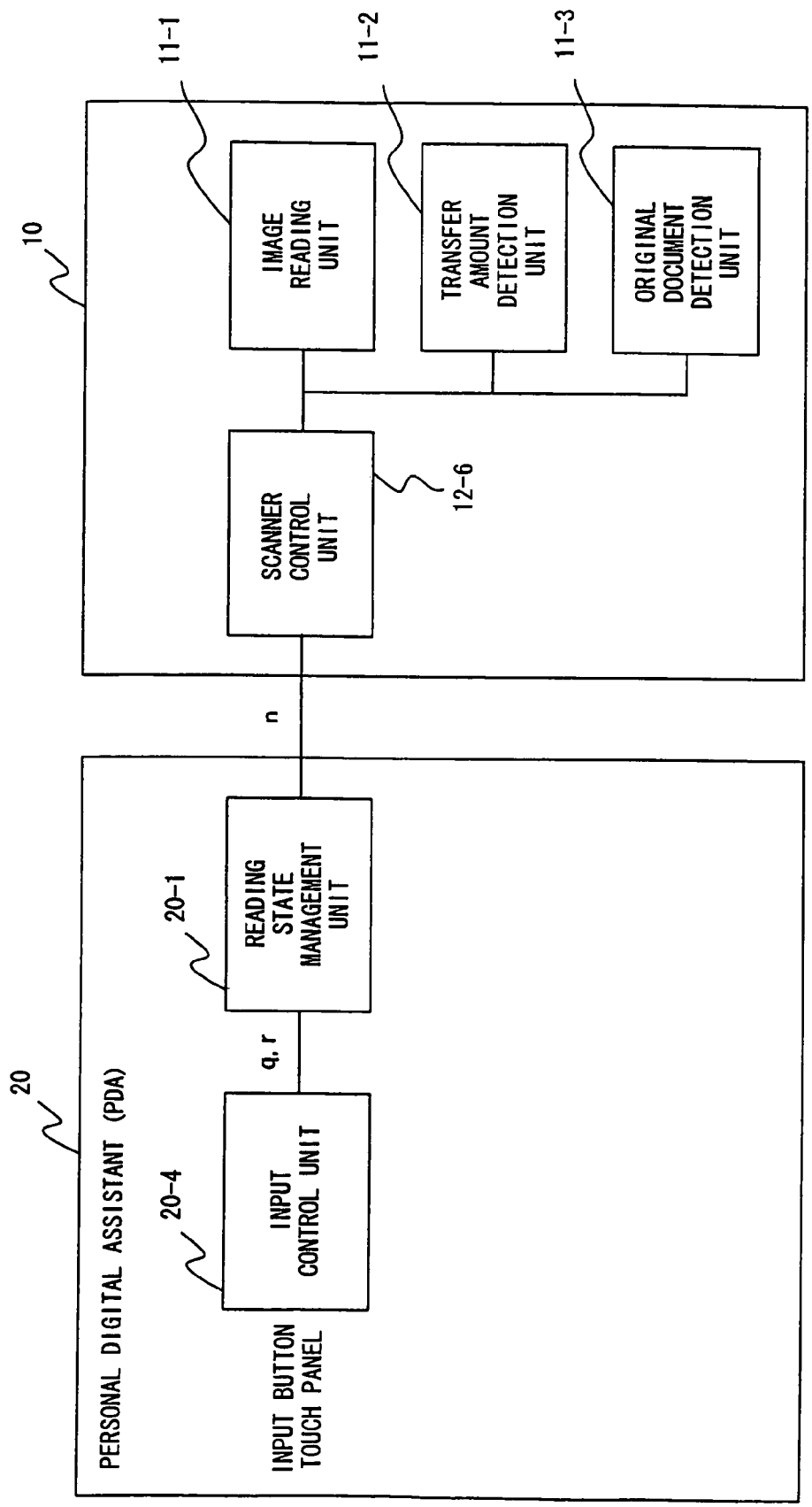
FIG. 12A is a block diagram of the function of the image reading process apparatus according to the sixth embodiment of the present invention.

FIG. 12A is a block diagram of the function of the image reading process apparatus according to the sixth embodiment of the present invention. FIG. 12B is an oblique view of the image reading process apparatus and explains the operating state of the image reading process apparatus. The appearance shown in FIG. 12B indicates the image reading process apparatus obtained by incorporating the image reading apparatus 10 into the top of the PDA 20 shown in FIG. 3A as one unit with the scanning surface of the image reading apparatus 10 directed downward.

The function block shown in FIG. 12A is configured by removing the image display unit 20-2 and the warning illumination unit 20-3 from the function block shown in FIG. 10. According to the reading state signal n of the image input from the scanner control unit 12-6 in the present embodiment, the reading state management unit 20-1 determines whether or not the input event from the input buttons 22 and 24 and the input event from the touch panel of the input display unit 21 are to be set valid depending on the reading state of an image, and outputs the determination as control signals q and r to the input control unit 20-4.

Thus, as shown in FIG. 12B, the functions of input units where a wrong inputting operation can be performed, for example, a touch panel portion enclosed by the ellipse Q indicated by a broken line which is the position of the thumb of the right hand of the user holding the PDA 20, or the portion of the input button 24 of the power supply by the middle or fore finger of the user, etc. are nullified. When the user holds the unit with the left hand, the palm of the hand can touch the input button 22 and the upper portion of the touch panel. In this case, not only the touch panel, but also all input buttons are nullified.

FIG. 13 is a comprehensible table of the process procedure by each of the above mentioned function blocks with the above mentioned configuration, and the process of the control of validity/invalidity of the input button and the touch panel performed by the input control unit 20-4 under the control by the reading state management unit 20-1 depending on the contents of the reading state indicated by the reading state signal n transmitted from the scanner control unit 12-6 corresponding to the process procedure.

FIG. 13 sequentially shows from left to right a procedure column 45, a reading state column 46, an input button column 47, and a touch panel column 48. The procedure column 45 indicates a procedure number, the reading state column 46 indicates the contents of the reading state signal n transmitted from the scanner control unit 12-6, etc., and the input button column 47 and the touch panel column 48 have the settings as to whether or not each input event is set valid.

As shown in FIG. 13, in a procedure 1 of switching a reading state shown in a reading state column into an image reading mode, input by an input button and a touch panel is invalid. In a procedure 2 of awaiting an original document, a procedure 3 of detecting an original document, a procedure 4 of awaiting the start of read scanning, a procedure 5 of read scanning, and a procedure 6 of terminating a read, input by an input button and a touch panel is also invalid.

In a procedure 7 of awaiting an operation from the user, an input button and a touch panel are still invalid. The subsequent procedure can be a procedure 8 or 9. In the procedure 8, the procedures 2 through 7 are repeated when the user resumes the image read scanning. If there is no image read scanning by the user, and a predetermined time has passed, then the image reading mode terminates in the procedure 8, and the input by the input button and the touch panel becomes valid.

Thus, when the input device for manual operation on the PDA 20 is set valid or invalid depending on the reading state of an image, an unnecessary inputting process is invalidated during the image reading operation. Therefore, the PDA 20 can be picked up more freely during the image reading operation. As a result, a more convenient image reading process apparatus can be provided.

As described above, according to the present invention, a power-saving and easily operable image reading process apparatus can be provided by controlling the operation of the function block of the image reading apparatus and the operation of the function block of the information processing device depending on the reading state of the image reading apparatus.

What is claimed is:

1. A portable image reading apparatus, comprising:
   a connection unit configured to connect with an information processing device, the information processing device has at least a display device and an intensity adjustment device for adjusting display intensity of the display device;
   an optical image read control device configured to read an image optically;
   a notification device configured to cause the intensity adjustment device to reduce display intensity of a backlight of the display device or cutoff power supply to the backlight while an image is optically read by the optical image read control device.

* * * * *